UNITED STATES PATENT OFFICE.

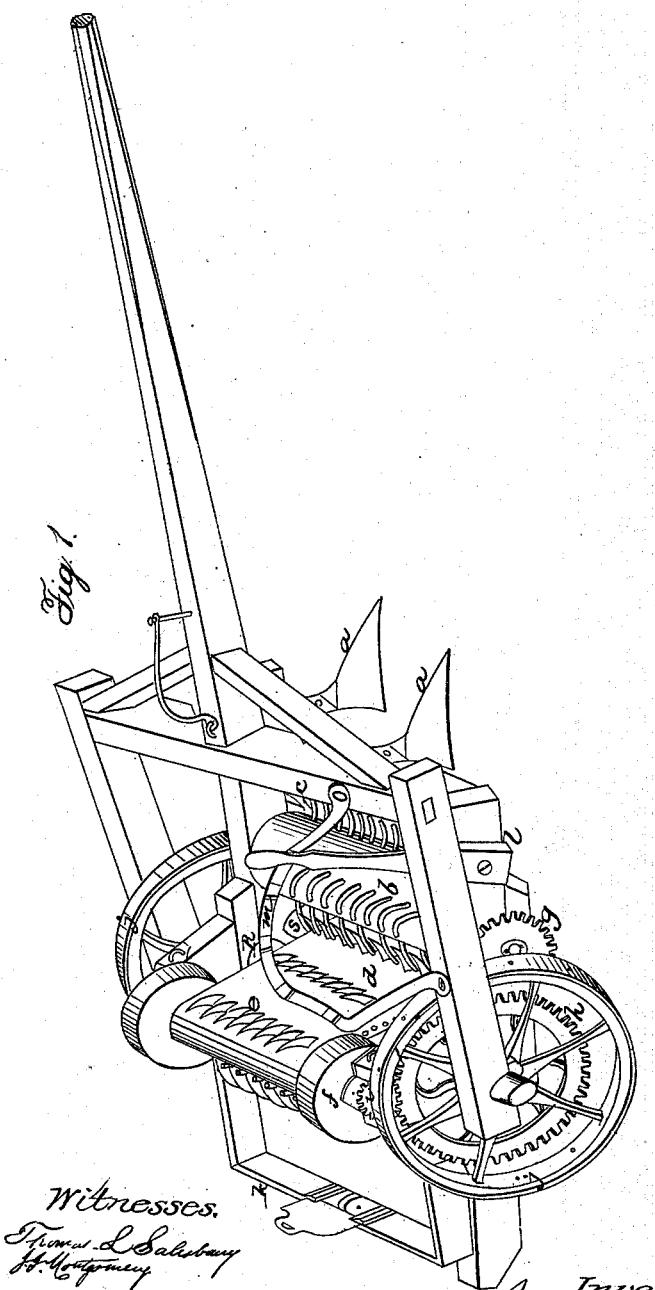

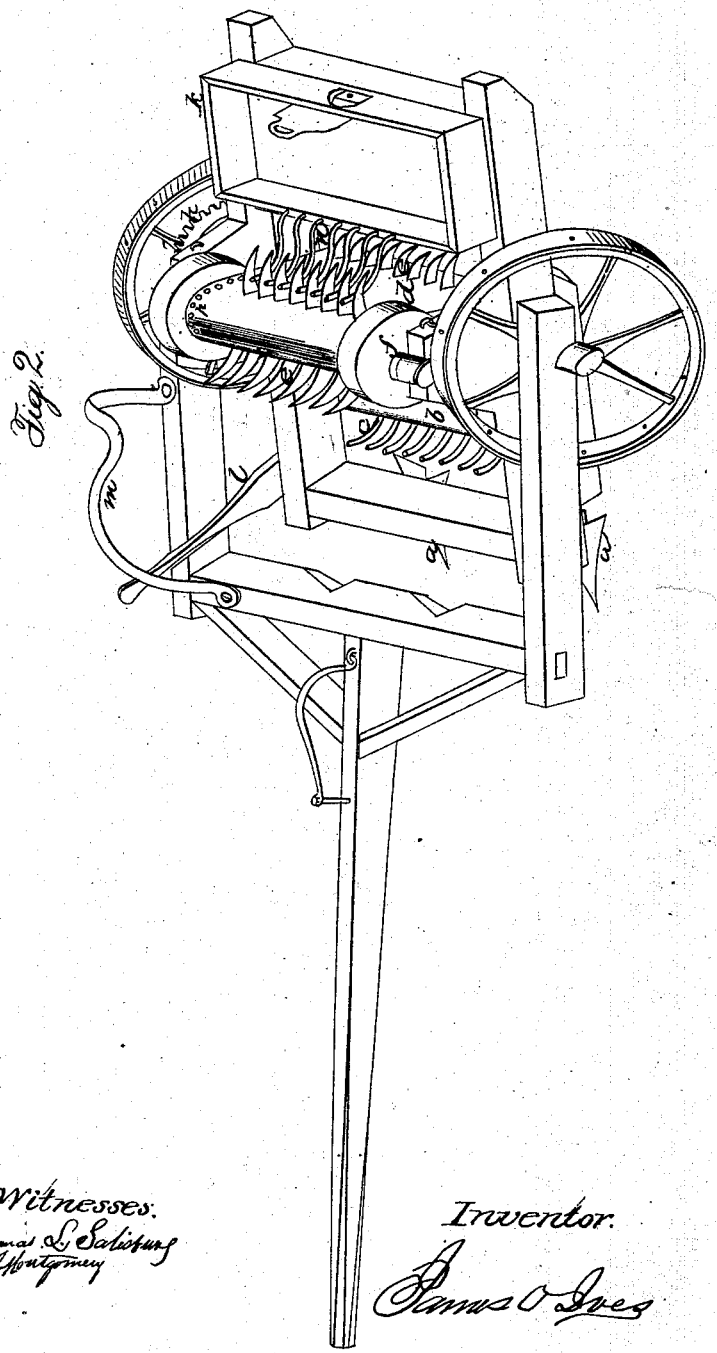

JAMES O. IVES, OF ST. LOUIS, MISSOURI.

IMPROVEMENT IN POTATO-DIGGERS.

Specification forming part of Letters Patent No. 49,413, dated August 15, 1865.

*To all whom it may concern:*

Be it known that I, JAMES O. IVES, of St. Louis, county of St. Louis, and State of Missouri, have invented a new and Improved Machine for Digging Potatoes; and I do hereby declare that the following is a full, clear, and exact description of the same, reference being had to the accompanying drawings, in which—

Figure 1 is a diagonal front view; Fig. 2, a rear view.

Fig. 1 shows a diagonal front view of the machine in position to work: *a a*, two double-mold-board plows; *b*, cylinder of boiler-iron or roller of wood; *c*, iron teeth, of oval curved shape, the teeth in the middle being longer than the others; *d*, leather belt or endless chain, with teeth *e e*, similar to those on cylinder; *f* and *s*, wood rollers; *g*, cog-wheel on end of cylinder; *h*, cog-wheel on axle-tree; *i*, cog-wheel on upper roller; *j j*, driving-wheels; *k*, box for potatoes; *l*, lever to raise or lower the machine; *m*, catch for lever; *o*, opening to let potatoes out of box.

Fig. 2, rear view: *n*, teeth in edge of box to clear belt from potatoes and guide them into the same; *p*, small pins on roller to keep belt from slipping on roller.

I claim—

1. Two rollers, *f* and *s*, one above and the other below the axle-tree *r*, extending round which is the belt *d*, with same kind of teeth as on cylinder, which teeth pass between those on the cylinder at every revolution and carry the potatoes over the upper roller, as shown and set forth.

2. A row of teeth on cylinder and on belt, to keep the potatoes from rolling out at either side of same, if necessary.

JAMES O. IVES.

Witnesses:
F. B. HOMES,
J. J. MONTGOMERY.